United States Patent [19]
Schubert

[11] Patent Number: 6,019,213
[45] Date of Patent: Feb. 1, 2000

[54] GROUPING AND BUFFER APPARATUS

[75] Inventor: Gerhard Schubert, Crailsheim, Germany

[73] Assignee: Gerhard Schubert GmbH, Germany

[21] Appl. No.: 08/665,909

[22] Filed: Jun. 19, 1996

[30] Foreign Application Priority Data

Jun. 19, 1995 [DE] Germany .............. 195 22 189

[51] Int. Cl.⁷ .................................................. B65G 47/26
[52] U.S. Cl. ...................................... 198/419.3; 198/431
[58] Field of Search .................. 118/419.3, 431

[56] References Cited

U.S. PATENT DOCUMENTS

| | | | |
|---|---|---|---|
| 4,180,154 | 12/1979 | Andersson | 198/431 |
| 4,558,779 | 12/1985 | Schmitt et al. | |
| 4,768,642 | 9/1988 | Hunter | 198/419.3 |
| 5,127,209 | 7/1992 | Hunter | 198/419.3 |
| 5,141,219 | 8/1992 | Watts et al. | 198/419.3 |

FOREIGN PATENT DOCUMENTS

| | | |
|---|---|---|
| 0105954 | 5/1986 | European Pat. Off. |
| 0613838 | 2/1994 | European Pat. Off. |
| 0503342 | 7/1930 | Germany |
| 3724839 | 7/1991 | Germany |
| 4124943 | 1/1993 | Germany |
| 4214886 | 11/1993 | Germany |
| 9306453 | 8/1994 | Germany |
| 4315391 | 11/1994 | Germany |

*Primary Examiner*—Jospeh E. Valenza
*Attorney, Agent, or Firm*—Browning Bushman

[57] ABSTRACT

A grouping and buffer apparatus for bringing together piece products in a feed region, for intermediatre storage of said products and for preparing a number of said products for removal in removal groups in a removal region, comprises a feed conveyor for the products, and at least first and second mutually parallel endless conveyors which extend in at least substantially mutually parallel relationship with at least one run. Each endless conveyor has at least one group of entrainment members thereon, for receiving the products from the feed conveyor and for transporting the products, and the endless conveyors are controllable independently of each other. The apparatus receives irregularly supplied products and temporarily stores same, and provides for groupwise discharge thereof.

17 Claims, 4 Drawing Sheets

GROUPING AND BUFFER APPARATUS

FIELD OF THE INVENTION

The invention concerns a grouping and buffer apparatus for bringing together individual piece products, further transporting said products and providing for intermediate storage thereof, and group-wise supply of said products.

BACKGROUND OF THE INVENTION

Machines of the above-indicated type are required in particular for arrangement between production machines or primary packaging machines which discharge their products individually and at time intervals which are not absolutely uniform, and packaging machines which introduce those individual products in a group-wise manner into an external packaging such as a cardboard or box, in relatively large numbers. That group-wise packaging operation must take place in a strictly controlled manner in respect of time in order not to involve unnecessary complications in the design and control of the secondary packaging machine.

In addition however grouping and buffer apparatuses of that kind may also be used in connection with other processing lines, for example conversely if products which are supplied in groups in a strictly cyclically controlled manner have to be separated and then passed along at irregular intervals of time. That is the case for example in the electronics industry in regard to supplying automatic fitting machines for electronic circuit boards with the individual electronic components and devices required.

The frequency of failure and stoppage and thus the efficiency of the overall production and packaging line are crucially determined by the operation of bringing the previously individual and separate piece products together to form groups and the step of compensating for irregularities in respect of time in terms of the supply of the individual products. In addition then the speed both at the delivery side and also at the discharge side is often higher relative to the speed of the previous machine so that the speed of the previous machine also determines the production of the overall installation.

German patent specification No 503 342 discloses an arrangement in which a chain carrying entrainment members passes around two horizontally disposed direction-changing or guide wheels. As however the guide wheels are arranged stationarily, there is no possibility of stopping the one run thereof, for example on the receiving side, and at the same time moving the other run which corresponds to the discharge side.

German patent specification No 37 24 839 discloses a similar machine in which the two guide wheels are mounted in a longitudinally displaceable carriage, with the carriage being displaced by way of screws which act thereon at both sides thereof in such a way that as required one of the two runs of the endless conveyor remains at rest while the other run is still moving so that the continuously arriving piece products can be individually received thereby.

That structure operates generally satisfactorily in a practical context but it suffers from the disadvantages in principle that is occupies a relatively large amount of floor area and that the receiving region and the removal region are in different runs of the endless conveyor and therefore the products carried in the endless conveyor must be passed around one of the guide wheels. As a result, when the endless conveyor is operating at high speeds, the products tend to be urged outwardly by the centrifugal force involved. Although it is possible to prevent the products from coming off the endless conveyor by a guide plate or the like, that can nonetheless give rise to problems due to damage to the packs or a restriction in terms of the maximum speed that can be employed.

Furthermore the production of that apparatus is complex and expensive, both from the mechanical point of view and also in terms of the controls involved.

SUMMARY OF THE INVENTION

An object of the present invention is to provide a grouping and buffer apparatus for receiving irregularly supplied piece products to be packaged and temporarily storing same and permitting group-wise discharge of the products for delivery for example to a packaging machine, which is of a simple and inexpensive construction.

Another object of the present invention is to provide a grouping and buffer apparatus which occupies a small amount of floor area by virtue of involving a compact and rational design configuration.

Still another object of the present invention is to provide a grouping and buffer apparatus for piece products which enjoys a high operating speed with simplicity of structure.

According to the principles of the present invention the foregoing and other objects are attained by a grouping and buffer apparatus for brining together piece products in a feed region, for the intermediate storage thereof, and for supplying a number of said products for removal in respective removal groups in a removal region. The apparatus comprises a feed conveyor for feeding the products to at least first and second at least substantially parallel endless conveyors which extend with at least one run thereof in at least substantially mutually parallel relationship. Each endless conveyor has at least one group of entrainment members thereon for receiving products from the feed conveyor and for transporting the products in groups. The apparatus has means for controlling the endless conveyors independently of each other.

As will be seen from the detailed description hereinafter of a preferred embodiment of the invention, the fact that the receiving elements or entrainment members are not disposed on one endless conveyor but on at least two separate endless conveyors, while nonetheless being moved along a line which is in alignment within the functional regions of the apparatus, and the fact that the two endless conveyors are controllable independently of each other mean that the necessary compensation effect in respect of time can be effected by virtue of the one endless carrier which carries a first group of entrainment members moving that group to the removal or discharge region while the second endless conveyor, with another group of entrainment members, moves same forwardly within the receiving region for filling thereof with fresh products.

The principle of the apparatus according to the invention can be most easily described by reference to two parallel endless conveyors which each have a respective group of successively disposed individual entrainment members.

Preferably, in that arrangement, the two endless conveyors are disposed in vertical planes in parallel relationship with each other and the functional or operational run will be in each case the upper of the two runs of each endless conveyor which are disposed close together and parallel to each other.

In that arrangement the entrainment members of the various endless conveyors are disposed along the operational runs on a single aligned line:

The entrainment members which are mounted on the for example chains or toothed belts of the endless conveyors are disposed outside the periphery of the respective endless conveyors and thus on the upwardly disposed functional or operational run, above the chain or belt. The fixings of the entrainment members relative to the chain or belt are disposed eccentrically so that by mounting the same entrainment members in a reversed arrangement on each of the two chains of the endless conveyors, the entrainment members on the one hand extend over the two chains and on the other hand are disposed on a single line along the operational runs of the endless conveyors, irrespective of the one of the two endless conveyors to which they are fixed.

In that arrangement the endless conveyors are only ever moved in one direction, more specifically the forward direction. The feed region for the individual products is disposed at the beginning of the operational run, while the removal or discharge region is approximately at the end of that operational run, that is to say within the same upwardly disposed run of the respective endless conveyors.

In that way it is possible for the group of entrainment members which are fixed to the first endless conveyor, after receiving a respective product, to be further advanced in the feed region by one position, by the endless conveyor in question being driven with a stepwise movement, so that that group of entrainment members is accordingly filled with products in dependence on the supply of individual products thereto.

When that group of entrainment members is completely filled with respective products, it is moved further along the operational run of the endless conveyor into the removal region where an entire removal group of products is removed from the group of entrainment members. The group removed can be the same in terms of number as the number of groups of entrainment members, or it can be a part of such a group of entrainment members, so that when the products are removed, the group of entrainment members may possibly have to be moved further along, by means of the endless conveyor.

Irrespective thereof, immediately after the filled group of entrainment members has been moved out of the feed region with products carried thereby, a group of entrainment members of the other endless conveyor which hitherto was stationed in a waiting position for example in the lower inoperative return run of the respective endless conveyor is moved into the feed region to receive products from the feed conveyor so that the individual products which are supplied in an irregular fashion in respect of time can be received without interruption.

The number of entrainment members per group depends on the degree of irregularity or non-uniformity in terms of the supply of individual products in the receiving or feed region, in order to ensure the necessary time-compensation function.

In that respect it may possibly be necessary to provide more than one group of entrainment members for each endless conveyor, in which case, as considered in the peripheral direction of the endless conveyors, one group of entrainment members of the one endless conveyor must follow a group of entrainment members of the other endless conveyor.

In order to have the necessary compensating clearance in regard to available space, it may also be necessary when the apparatus has two endless conveyors for the endless conveyors to be so designed that the functional or operational region, that is to say the section from the receiving or feed region of the respective conveyors to the removal region, is clearly less than half the total length of the endless conveyors, for example by virtue of the fact that the functional or operational region is markedly shorter than the length of the operational run of the endless conveyor, in which the functional or operational region is disposed. In that way for example it is possible to arrange two respective groups of entrainment members on only one endless conveyor.

One advantage is that the feed region and the removal region can each be disposed in the same run of the endless conveyors, and there is therefore no need for the products which are carried by the endless conveyors to undergo a change in direction. That permits the endless conveyors to operate at very high speeds.

A further advantage lies in the small amount of floor area required, more especially when the individual endless conveyors are arranged in vertical planes.

In that way it is also possible for a plurality of such grouping and buffer apparatuses to be arranged in parallel juxtaposed relationship. If in that case the individual apparatuses are of different lengths, the products can be supplied thereto for example at a right angle to the endless conveyors, but in respective axially displaced relationship, while the removal regions of the individual apparatuses can be at the same height in juxtaposed relationship, so that a removal device, for example a removal robot, can very readily approach those regions, for example in order to remove respective groups of different products, for example different chocolate candies, to be removed from the juxtaposed grouping apparatuses, so that such products can be deposited in a common external packaging, for example a candy box.

In a particularly simple design configuration the entrainment members may all be identical and have in juxtaposed relationship a number of fixing options corresponding to the number of juxtaposed endless conveyors. In that case each entrainment member or each group of entrainment members can be fixed to the outside periphery of a respective one of the endless conveyors, this being something which is particularly simple if the entrainment members themselves in turn are guided in lateral guides so that it is only the transport movement that has to be transmitted from the endless conveyors to the entrainment members.

In that respect it is also not necessary for each individual entrainment member to be connected to one of the endless conveyors, for example a transport chain. It is also possible for the individual entrainment members within a group to be pivotably connected together, and for only one entrainment member of each group to be connected to the relevant transport or conveyor chain, preferably the first or the last entrainment member in the respective group, so that the entire group is always held in a play-free condition by virtue of a tension force or a compression force applied thereto and the individual entrainment members within the group are always at the same axial spacing relative to each other.

In general the entrainment members will also be disposed outside the periphery of the endless conveyor or chain, that is to say they will seek to move radially outwardly from the substantially circularly moving endless conveyors. The individual entrainment members may also comprise a plurality of entrainment portions which in turn may be pivotably connected to each other. If each individual entrainment member comprises only two entrainment portions, each of the portions could form a flank of the entrainment member, between which the product to be received is then held.

That has for example the advantage that the entrainment portions which tend to move radially outwardly, on being passed around a guide roller, open in a V-shape in an outward direction so that, when products are supplied in that region, the products can be easily fitted to the entrainment members and a limited clamping effect on the product between the individual portions of the entrainment member can possibly be achieved by the subsequent movement of the portions towards each other into an at least substantially parallel position, when the straight operational run of the endless conveyor is reached.

A further advantage with that form of apparatus is that the individual portions, for example a front portion and a rear portion of an entrainment member, do not have to be directly connected together in a line.

If, in place of an endless conveyor, the apparatus employs first and second partial endless conveyors or endless conveyor portions which are disposed in mutually parallel juxtaposed relationship, it is possible for the line comprising the mutually corresponding for example front portions of the entrainment members to be fixed to one of the endless conveyor portions, and for the line comprising the other entrainment portions, for example the rear portions of the entrainment members, to be fixed to the other endless conveyor portion.

Relative movement of the two endless conveyors with respect to each other can uniformly vary the distance between the front portion and the rear portion of each of the individual entrainment members over the entire endless conveyor, for example if the dimensions of the products to be received and transported thereby are altered.

To a limited extent such adjustment is also possible when the apparatus employs a single endless conveyor, for example insofar as the line comprising the one portions of the entrainment members, for example the front portions, is then connected directly to the endless conveyor, while the line comprising the other, for example rear portions of the entrainment members is admittedly also connected to the same endless conveyor but is limitedly movable or adjustable relative thereto in the direction of conveying movement.

In addition control is required only in respect of the length of displacement and the speed of the individual endless conveyors, and that can be achieved in a comparatively simple manner by motors which can be readily controlled, for example stepping motors. There is no need for a complicated and expensive mechanical structure.

Another option in this respect involves operating with more than two endless conveyors which co-operate insofar as their operational runs are arranged in at least substantially mutually parallel relationship. In that way each endless conveyor may be provided with only one group of entrainment members.

With machines of that kind the piece products are usually supplied at a right angle to the direction of transportation movement of the endless conveyors, that is to say when the endless conveyors are disposed perpendicularly, with a horizontally guided, generally upwardly disposed operational run, the supply of products is effected horizontally from the side or perpendicularly at a right angle to the operational run, from above. The entrainment members which have cavities or recesses corresponding to the products to be received must be accessible and open at least in the respective product-supply direction involved.

That however does not always have to be the case but may depend on the individual circumstances of the respective situation of use involved:

Thus it is for example possible for the piece products to be supplied at a right angle to the direction of transportation movement of the operational run of the endless conveyor, but not necessarily also at a right angle to the overall plane of the endless conveyor, but for example in that plane radially from the outside on to the endless conveyor.

It is likewise possible for the supply of products to be effected perpendicularly as indicated above, but not within the same run which also includes the removal region, but in the preceding run. That arrangement admittedly involves therebetween a change in the direction of movement of the products around one of the guide rollers, with the resulting difficulties caused by centrifugal force and possible damage, but on the other hand that automatically involves the product being turned through 180°, which may be necessary or desirable.

Another possible option is to provide for the feed neither in the run involving the removal region nor in the preceding run, but precisely in the region of the direction-changing or guide roller disposed between those two runs. On the one hand, that makes it possible for the feed direction to be parallel to the direction of transportation movement of the endless conveyor in the operational run or in the run containing the removal region, while furthermore, when the entrainment members are of a multi-part nature whose individual portions tend to move radially outwardly from the guide roller in the region thereof, the space between the portions of the respective entrainment members spreads open in a V-shape in the region of the guide roller. That makes it particularly easy for products to be introduced in that region, while in addition the products can even be subjected to a clamping effect in the entrainment members by virtue of the subsequent reduction in the space between the portions of the respective entrainment members, after moving away from the guide roller. That can also be in particular supplemented in a meaningful manner if removal of the products possibly also takes place in the region of the next guide roller, in which case that guide roller can be of a suitably large radius, depending on the degree to which the portions of the respective entrainment members are to be spread apart to release the respective products.

When using only two endless conveyors, the apparatus can be of a very simple mechanical design configuration, more specifically irrespective of the necessary length of the specific endless conveyor, insofar as the direction-changing or guide pinions or gears of which one serves as a drive pinion or gear are each mounted in an extruded member which, for the specific situation of use, only has to be cut to the appropriate length and suitably recessed or apertured at its ends, then using a suitable chain of appropriate length. Conveyor chain units of that design configuration which are disposed in parallel relationship and which are generally vertical can each receive a respective servo motor which is fitted on to a respective one of the drive pinions or gears at a lateral position and at a location which faces away from the other chain conveyor, the arrangement in that respect preferably being such that the servo motors are not fitted to the guide wheels or gears which are in alignment with each other, but rather the two servo motors are preferably disposed at the mutually opposite ends of the machine.

A further advantage of such an arrangement is that the chains used for the endless conveyors are laterally provided on each respective side with pins which project out of the eyes of the respective chain and the entrainment members can be easily fitted from the outside, by means of a suitable bore therein, on to pins which again face away from the respective other chain conveyor. The entrainment members are prevented from lateral movement or slipping off in the same direction by simply fitting to the side thereof a securing plate which is screwed to the support member.

That arrangement, by removal of the securing plate, permits entrainment members on an endless conveyor to be quickly and easily replaced, reduced or added to.

If that option is also to be retained when there are more than two endless conveyors in a machine, that is only possible if the inoperative return run for example of the central endless conveyor is lower than the inoperative return runs of the other two or more outwardly disposed endless conveyors. In that way, in terms of fitting of the entrainment members on the outwardly disposed endless conveyors, the procedure involved may be that described above, while in the case of the central endless conveyor replacement of the entrainment members admittedly takes place in a similar fashion, but the replacement operation can only be effected on the inoperative return run which is accessible from the side as it is at a lower position. The securing plate can nonetheless be screwed on from the side, without any serious problem.

In order to permit the servo motors to be laterally fitted to the respective drive pinions or gears, in spite of the small parallel spacing between the individual endless conveyors, the guide wheels and drive pinions or gears thereof can be arranged in displaced relationship in the longitudinal direction of the chain conveyors so that no other aligned pinion or gear of an adjacent chain conveyor is disposed on the outsides of the drive pinions or gears.

Further features, objects and advantages of the present invention will be apparent from the following description of a preferred embodiment thereof.

DESCRIPTION OF THE PREFERRED EMBODIMENT

Figure 1:
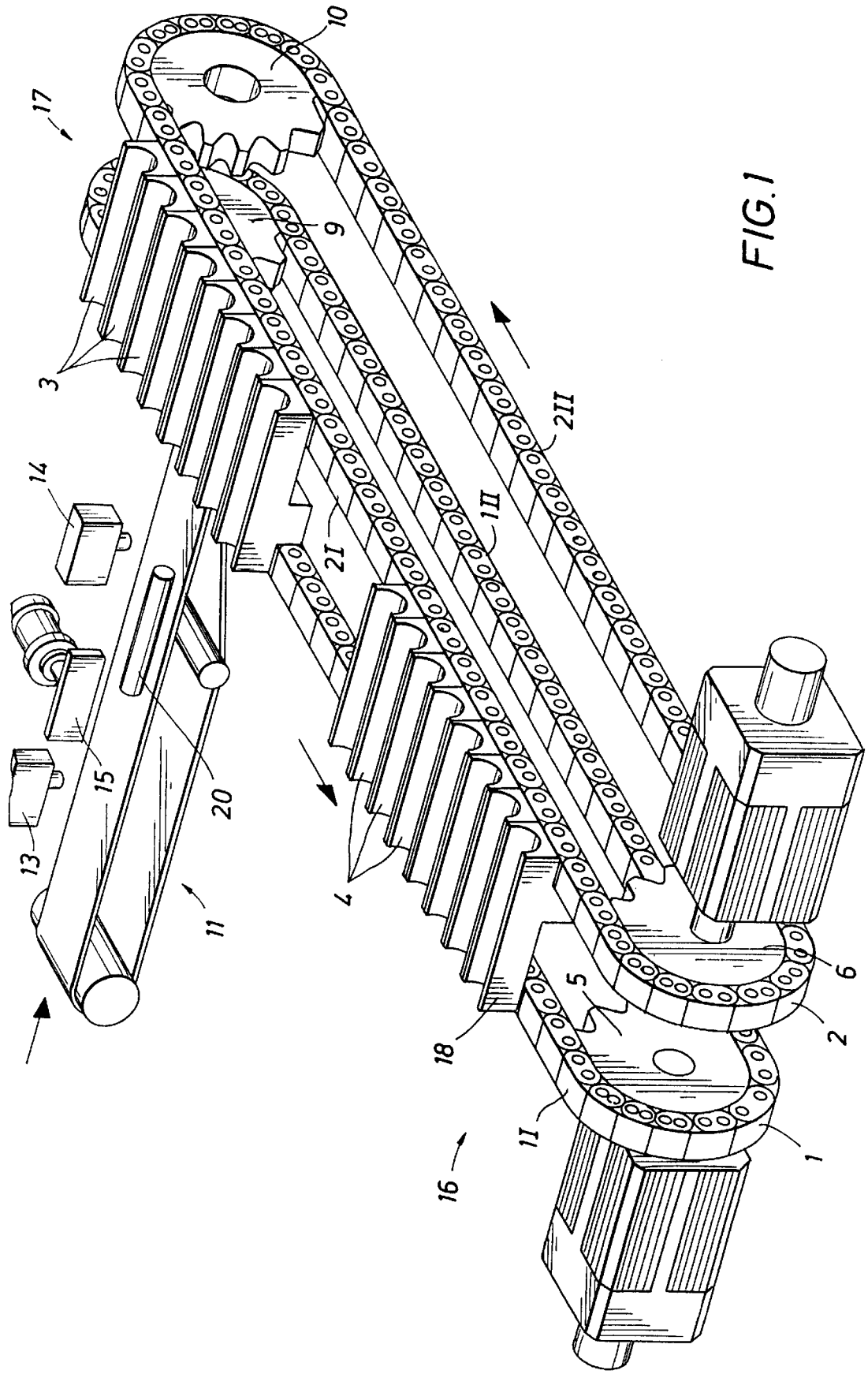
FIG. 1 is a diagrammatic perspective view showing the principles of the apparatus according to the invention.

Reference will firstly be made to FIG. 1 which is a diagrammatic perspective view showing the principle of the machine according to the invention, but without the main frame structure, housing, mounting means and the like.

In the illustrated apparatus individual products 20 are carried on the conveyor belt of a feed conveyor 11 and are delivered to the apparatus according to the invention horizontally and at a substantially right angle relative thereto. In the feed region 17, the products 20 are deposited in entrainment members 3, 4 which have suitable recesses or openings for receiving the respective products 20. At a position which is displaced in the longitudinal direction of the apparatus the products 20 are then removed in groups in the removal region 16, which can be effected at the same side as the feed conveyor 11 or the opposite side thereto.

The removal device for removing the products 20 in the removal region 16 is not shown in FIG. 1 but may involve suitable devices such as grippers, pushers or the like, and the size of the groups of the removal units may either correspond to the number of entrainment members 4 in the group 3, or an integral fraction thereof.

Irrespective of the fact that the entrainment members 3, 4 are fixed on different endless conveyors 1, 2, the entrainment members are arranged in alignment with each other in the direction of transportation movement, that is to say in the longitudinal directions of the respective functional or operational runs 1I, 2I. This is achieved by virtue of the fact that the two endless conveyors 1, 2 which are guided in parallel planes are arranged in mutually parallel relationship at such a small spacing from each other than the entrainment members 3, 4 of the one endless conveyor 1, 2 extend over the respective other endless conveyor 2, 1. It will be noted however that it is not absolutely necessary from the functional point of view for the entrainment members to extend over the respective other endless conveyor in that way. For example the endless conveyors could also be further apart and the entrainment members 3, 4 may project from one of the endless conveyors in the region between the two endless conveyors. That however would result in the apparatus occupying a greater amount of space.

It will be seen by way of example from FIG. 1 that the two endless conveyors 1, 2 shown therein are conventional drive chains. The entrainment members must extend over the respective other endless conveyor 1, 2 in particular if the entrainment members 3, 4 can be connected to the chain laterally horizontally by being pushed on to same or pushed into same, and the operation of pushing the entrainment members on to the respective endless conveyor 1 is to be effected at the free side of the endless conveyor 1, which is remote from the oppositely disposed endless conveyor 2, 1, as is shown in particular in FIG. 4.

The individual entrainment members 3, 4 are each individually connected to the endless conveyors 1, 2 in order to be able to provide for bending of the chain when it is passed around drive gears or pinions 5, 6 or guide gears or pinions 9, 10.

Over the section before reaching the feed region 17 of the endless conveyors 1, 2, in the direction of movement of the feed conveyor 11, the feed conveyor 11 has spaced-apart photoelectric cells 13, 14 and a pusher member 15 which is arranged therebetween and which acts transversely with respect to the feed conveyor 11, on the piece products 20 which are carried thereon. The pusher member 15 is actuated in such a way that, if the products 20 occur in an excessively rapid succession on the feed conveyor 11, individual products can be laterally pushed off the feed conveyor 11 by means of the pusher member 15 in order to ensure that there is an adequate minimum spacing between the products 20 on the continuously moving feed conveyor 11, in order thereby to have a sufficient period of time that the appropriate endless conveyor 1 or 2 can be advanced in the feed region 17 by a distance corresponding to a respective entrainment member 3 or 4, so that the next product 20 can be appropriately received in an empty entrainment member 3, 4.

Figure 2:
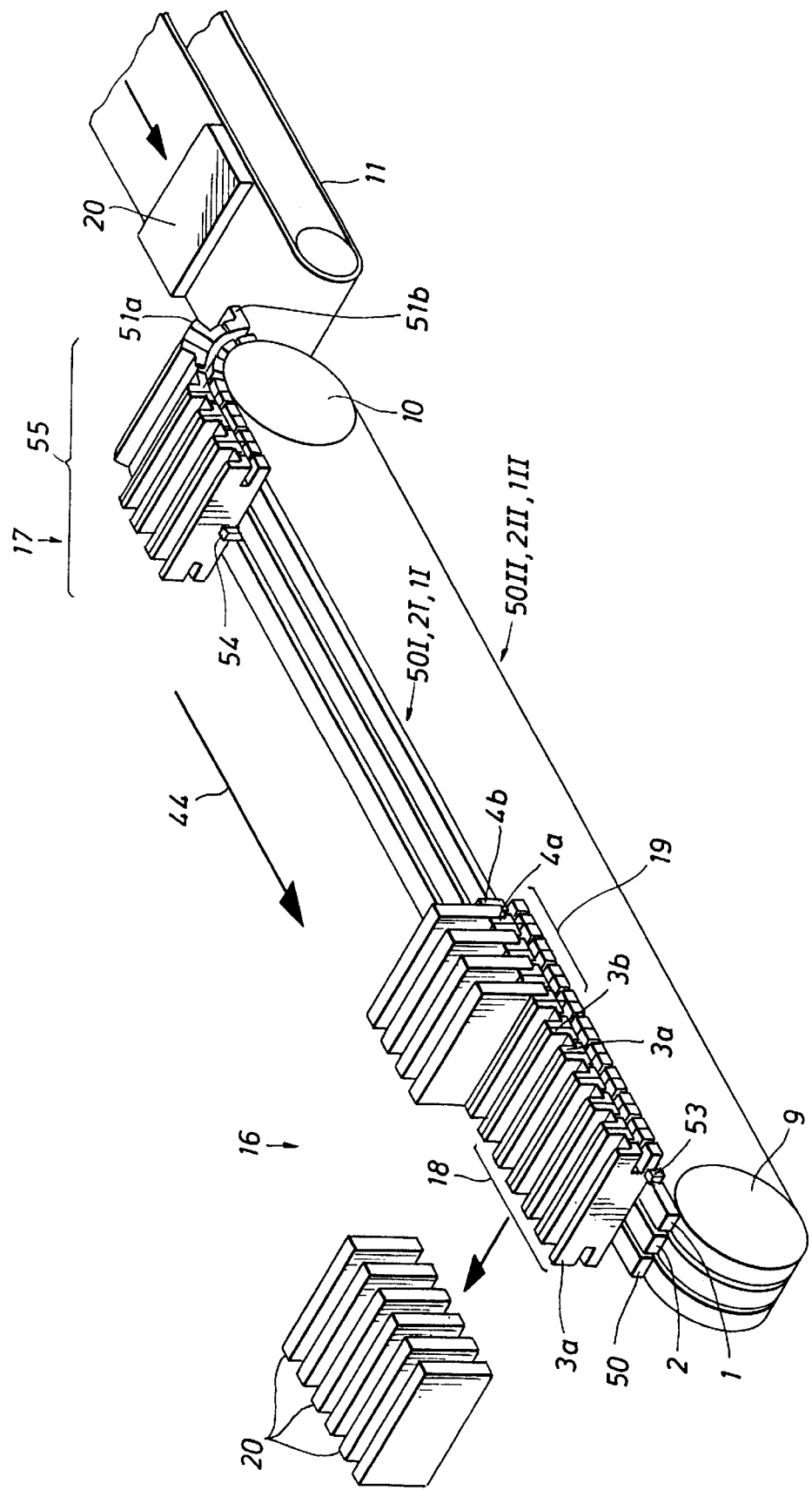
FIG. 2 shows a structure having three endless conveyors.

Reference will now be made to FIG. 2 which is a view showing the principle of a form of the apparatus which comprises three endless conveyors 1, 2 and 50 and which moreover is of a different design configuration essentially in regard to the details outlined below.

On the one hand, in this case the entrainment members 3, 4, 51 which extend in an aligned row are themselves laterally positively lockingly guided in the longitudinal direction by U-shaped guide rails 43a and 43b which embrace suitable projections on the entrainment members 3, 4, 51, from the outside thereof.

On the other hand the groups 18, 19, 55 of entrainment members which are respectively fixed to each of the endless conveyors 1, 2, 50 are respectively pivotably connected together in a kind of line, and, out of each group, only one entrainment member, more specifically the entrainment member which is at the front in the direction of conveying movement 44, is connected to the corresponding endless conveyor 1, 2, 50 by way of a connecting pin 52, 53 and 54 respectively. In that arrangement the connecting pins 52, 53, 54 project outwardly substantially perpendicularly from the endless conveyor 1, 2, 50 and into the respective entrainment member 3, 4, 51 and can there possibly be fixed from the top side by means of a quick-action locking device or the like.

In addition the individual entrainment members 3, 4, 51 which in this case are of a U-shaped cross-section in side view in dependence on the product to be received thereby are of a two-part construction and thus each comprise a front portion as indicated for example at 3a and a rear portion 3b.

When the entrainment member passes around the respective guide pinions or gears 9, 10 therefore the space between the front portion and the rear portion (for example 51a, 51b) spreads open in a V-shape so that the parallelepipedic flat products 20 can be particularly easily introduced into the respective entrainment members in the region of the rear guide gear or pinion 10, while when the entrainment members subsequently close so that the space between the respective portions of each entrainment member is of the normal size, on reaching the upper run as indicated for example at 50a of the respective endless conveyor, the product is then received in the entrainment members with such an accurate fit that, with the entrainment embers in such a condition, it would scarcely be possible for the products to be actually fitted into same. That even permits the products 20 to be lightly clamped in the respective entrainment members 3, 4, 51.

A further advantage in this respect is the fact that the products are each turned through 90°, which is particularly desirable when dealing with flat, generally plate-like products which are generally supplied to the endless conveyors 1, 2, 50 in a position of lying on a feed conveyor as indicated at 11 in FIG. 1, if, as is frequently desired, such products are to be packaged. In addition, the products can be supplied in the receiving region 17 of the apparatus in a direction which corresponds to the direction of conveying movement as indicated at 44. That permits the apparatus to be of an elongate narrow configuration and thus permits it to be readily incorporated into a production line which is generally also of a similar elongate configuration.

For the sake of enhanced clarity of the drawing, the apparatus is shown in FIG. 2 in partial section, and only one group 18, 19, 55 of the entrainment members 3, 4, 51 is illustrated for each endless conveyor 1, 2, 50.

However, in order to reduce the movements of the apparatus which do not involve transporting articles, two such groups of entrainment members may also be disposed on each of the endless conveyors 1, 2 and 50, more specifically in diametrally opposite relationship as considered in relation to each endless conveyor. Thus, after such a group as indicated for example at 18 in FIG. 2 has been emptied of products 20 in the removal region 16, that group does not have to be moved into the receiving region 17, but the other, diametrally opposite group on the same endless conveyor, which in that case is already just upstream of the receiving region 17, is then moved into the receiving region 17, for which purpose it only has to cover a short distance to move into the receiving region 17.

Figure 3:
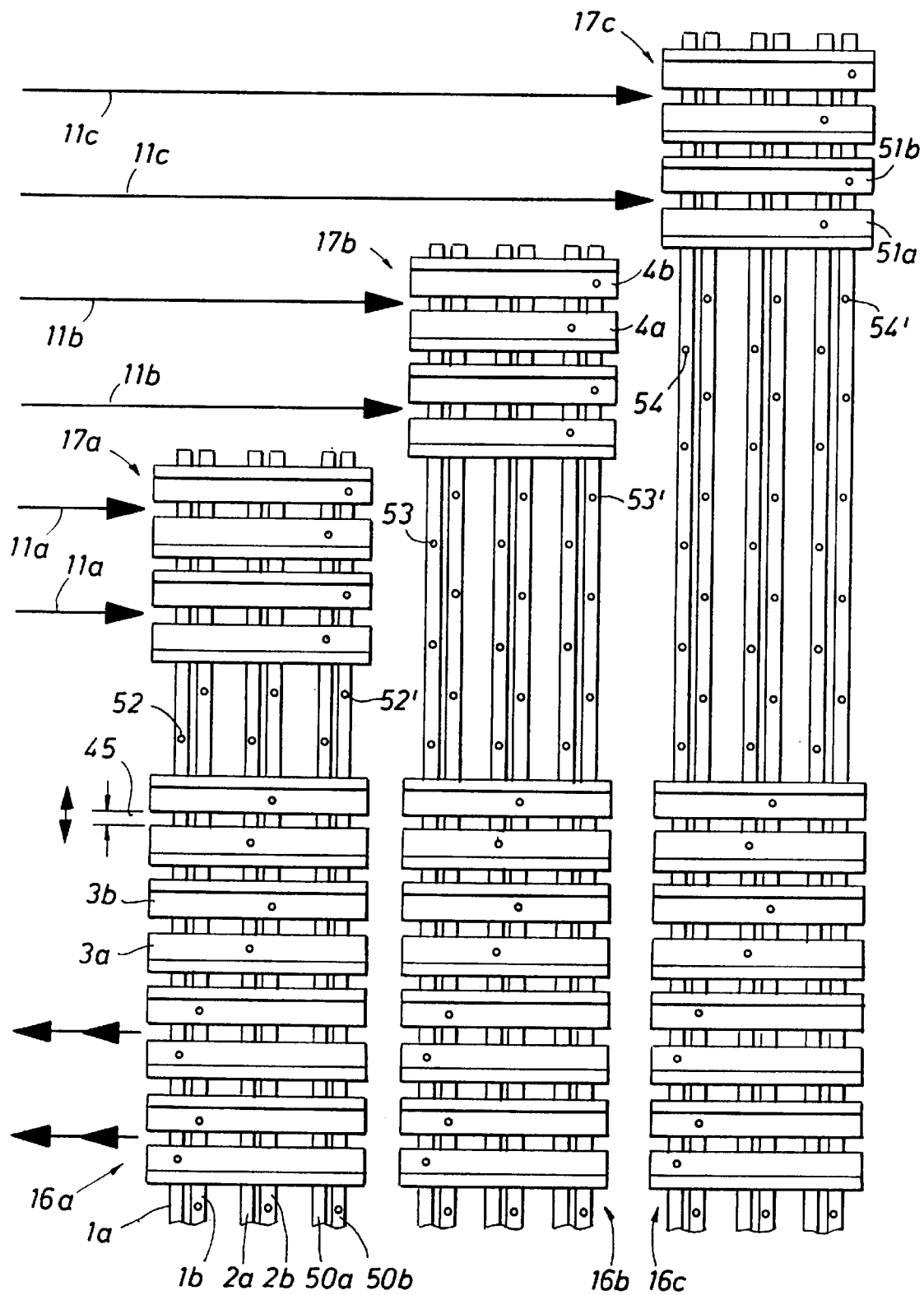
FIG. 3 is a plan view of an arrangement comprising a plurality of apparatuses according to the invention of which one is that shown in FIG. 2.

Reference will now be made to FIG. 3 showing a plan view of an arrangement in which three apparatuses according to the invention are arranged parallel side-by-side, the apparatuses corresponding for example to the apparatus shown in FIG. 2.

As can be seen from the view in FIG. 3, the three grouping and buffer apparatuses which are disposed in parallel side-by-side relationship are of different lengths but terminate at the same height. The stepped beginning of the three apparatuses, which is at the top in FIG. 3, is utilized so that the feed conveyors 11a, 11b and 11c which supply products to the grouping apparatuses at a 90° angle can be arranged in displaced parallel relationship, without hindering or impeding each other. Thus, the three receiving regions 17a, 17b and 17c of the endless conveyors are displaced relative to each other in the longitudinal directions of the grouping apparatuses, while the removal regions 16a, 16b and 16c are disposed parallel and one beside the other. That makes it much easier for the removal groups 21a, 21b, 21c of products, which in this case are to be removed from the individual grouping apparatuses, to be disposed in a common packaging, irrespective of whether the operation of removing products from the grouping apparatuses is effected by means of robots or simple pushing devices.

A further difference in the arrangement shown in FIG. 3, in comparison with the apparatus shown in FIG. 2, is that in FIG. 3 each individual endless conveyor as indicated for example a 1, 2 and 50 in turn comprises two separate partial endless conveyors or endless conveyor portions as indicated for example at 1a and 1b, which are preferably also guided parallel closely one beside the other.

In that arrangement the groups 18, 19, 55 of entrainment members do not form a line which is pivotable in itself, but each group comprises two lines which are intertwined with each other, wherein the one line comprises the front portions for example 3a of the entrainment members while the other line comprises the rear portions 3b thereof.

Each of those lines is connected to one of the endless conveyor portions, for example 1a or 1b respectively. In the view shown in FIG. 3, each individual one of the front and rear portions 3a and 3b of the entrainment members is individually connected to one of the endless conveyor portions 1a and 1b, as indicated by the connecting pins diagrammatically indicated at 52, 52', 53, 53', 54, 54'. Likewise however only a part of each line could be connected to one of the endless conveyor portions, as described above with reference to FIG. 2.

By virtue of that connection of the front portions 3a of the entrainment members 3 to the endless conveyor portion 1a and the rear portions 3b of the entrainment members 3 to the endless conveyor portion 1b, the spacing from the front portion 3a to the rear portion 3b may be adjusted jointly for all entrainment members of the endless conveyor 1, by the two endless conveyor portions 1a and 1b being moved somewhat relative to each other. In that way the spacing 45 between the front portion 3a and the rear portion 3b can be enlarged or reduced, as indicated by the arrows. That permits adaptation when the dimensions of the products are altered, or it also only provides for optimization of the grouping and buffer apparatus, in regard to handling of the products 20, without the size of the space afforded in each of the entrainment members for receiving the respective products having to be precisely established from the outset by virtue of the structural configuration involved; it will be noted that it is very important for the intermediate space in the entrainment members, for receiving the respective products, to be of the correct size.

Figure 4:
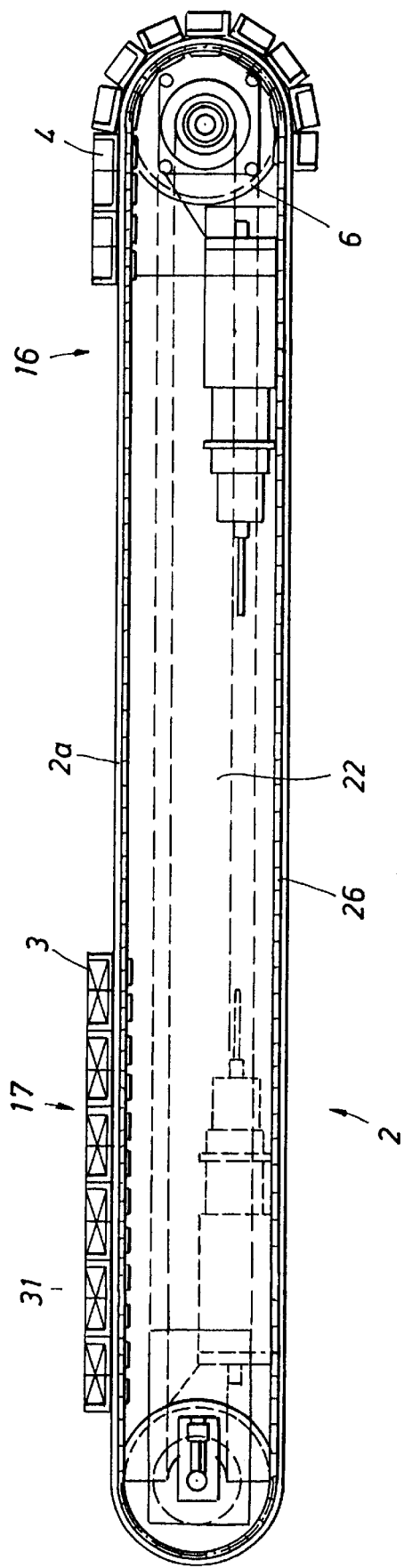
FIG. 4 is a side view of one of the two endless conveyors.

Reference will now be made to FIG. 4 showing a specific design configuration of the apparatus according to the invention. FIG. 4 is a side view of the endless conveyor 2 while the corresponding parts of the endless conveyor 1, which are disposed behind the endless conveyor 2 and which are therefore not visible are indicated in dash-dotted line.

The endless conveyor 2 in this case always moves in the clockwise direction in FIG. 4. In the feed region 17 the entrainment members 3 which are fixed for example on the endless conveyor 1 (not visible) which is behind the endless conveyor 2 are successively filled with products by means of the feed conveyor 11 and for that purpose the rearwardly disposed endless conveyor 1 is always advanced by a distance corresponding to the spacing of the entrainment members 3.

In comparison the entrainment members 4 shown in the right-hand half of FIG. 4 are connected to the visible endless conveyor 2 and immediately previously in the region 16 were emptied of the products 20 in a group-wise manner to the packaging machine so that they are just moving around the gear or pinion 5 from the operational run 2a in the direction of the non-operational return run 2b. As is clearly apparent, in the situation shown in FIG. 4 the entrainment members 4 are markedly longer in the longitudinal direction of the endless conveyor in the form of a chain, than a chain link, and are therefore divided in half in the longitudinal direction so that each half is fixed to a chain link. That admittedly results in the two halves of each entrainment member 4 being spread open on passing around one of the pinions, but that is not harmful as, while passing around the pinion, no products 20 are received in the entrainment members 3, 4 as the entire operational region of the endless conveyor is within the one run 2a. By virtue of the entrainment members 4 being divided into individual portions however it is possible to achieve substantially better fixing and guidance thereof in relation to the chain of the endless conveyor 2.

Although the entrainment members 3, 4 in FIG. 4 are of a different form from that shown in the diagrammatic view in FIG. 1, they are however also again open at the ends and upwardly, that is to say facing outwardly away from the circulating chain of the endless conveyor 2. The direction in which the entrainment members 3, 4 are open however is dependent exclusively on the feed and removal direction and the ancillary devices which are used for the feed and removal operations.

It will be appreciated that the above-described embodiments of the apparatus according to the invention have been set forth solely by way of example and illustration thereof and that various modifications and alterations may be made therein without thereby departing from the spirit and scope of the invention.

What is claimed is:

1. A grouping and buffer apparatus for bringing together piece products in a feed region, for the intermediate storage of said products and for preparing a number of said products for removal in removal groups in a removal region, comprising a feed conveyor for the products at least first and second at least substantially parallel endless conveyors which extend in at least substantially mutually parallel relationship with at least one run thereof, at least one group of entrainment means on each endless conveyor for receiving products from the feed conveyor and for transporting the products, and means for controlling the endless conveyors independently of each other, wherein the entrainment means are interchangeable.

2. Apparatus as set forth in claim 1 wherein, the number of entrainment means of a group of an endless conveyor is variable.

3. Apparatus as set forth in claims 1 or 2 wherein the feed region and the removal region are each arranged within the same at least substantially mutually parallel run of the endless conveyors.

4. Apparatus as set forth in claims 1 or 2 wherein the feed region and the removal region are each arranged within runs of the endless conveyors, which runs adjoin each other in the transport direction.

5. Apparatus as set forth in claims 1 or 2 wherein the respective entrainment means are fixed to a said endless conveyor and extend over the respective other endless conveyor.

6. Apparatus as set forth in claims 1 or 2 including means for guiding the endless conveyors in mutually parallel relationship in vertical planes.

7. Apparatus as set forth in claim 1 wherein the entrainment means are interchangeable.

8. Apparatus as set forth in claims 1 or 2 wherein the number of entrainment means of a group is an integral multiple of the number of products of a removal group.

9. Apparatus as set forth in claims 1 or 2 wherein the number of endless conveyors is at least three and the number of entrainment means of a group is not an integral multiple of the number of products of a removal group.

10. Apparatus as set forth in claim 1 wherein the number of entrainment means of a group of an endless conveyor is variable.

11. Apparatus as set forth in claims 1 or 2 wherein the conveyor direction of the feed conveyor extends at least substantially at a right angle to the direction of and at the level of the parallel runs of the endless conveyors.

12. Apparatus as set forth in claims 1 or 2 including guide rollers guiding the endless conveyors, wherein the conveyor direction of the feed conveyor extends at least substantially parallel to the direction of the parallel runs of the endless conveyors and at the level of the guide rollers preceding the parallel runs, the arrangement being such that the entrainment means tend away radially with respect to the guide rollers.

13. Apparatus as set forth in claims 1 or 2 including a servomotor associated with each endless conveyor.

14. Apparatus as set forth in claims 1 or 2 wherein the entrainment means each comprise at least first and second entrainment portions.

15. Apparatus as set forth in claims 1 or 2 wherein the endless conveyors each comprise at least first and second at least substantially parallel endless conveyor portions, wherein the entrainment means each comprise at least first and second entrainment portions, and wherein the entrainment portions are fixed to respective endless conveyor portions to constitute respective mutually supplementary groups thereof.

16. A grouping and buffer apparatus for bringing together piece products in a feed region, for the intermediate storage of said products and for preparing a number of said products for removal in removal "groups" in a removal region, comprising a feed conveyor for the products, at least first and second at least substantially parallel endless conveyors which extend in at least substantially mutually parallel relationship with at least one run thereof, at least one group of entrainment means on each endless conveyor for receiving products from the feed conveyor and for transporting the products, and means for controlling the endless conveyors independently of each other, wherein the entrainment means of a group are pivotably connected together and only the first entrainment means of each group is connected to one of the endless conveyors.

17. A grouping and buffer apparatus for bringing together piece products in a feed region, for the intermediate storage of said products and for preparing a number of said products for removal in removal "groups" in a removal region, comprising a feed conveyor for the products, at least first and second at least substantially parallel endless conveyors which extend in at least substantially mutually parallel relationship with at least one run thereof, at least one group of entrainment means on each endless conveyor for receiving products from the feed conveyor and for transporting the products, and means for controlling the endless conveyors independently of each other, wherein the entrainment means of a group are pivotably connected together and only the last entrainment means of each group is connected to one of the endless conveyors.

* * * * *